United States Patent
Ma et al.

(10) Patent No.: US 8,248,885 B2
(45) Date of Patent: Aug. 21, 2012

(54) SUB-BEAM FORMING RECEIVER CIRCUITRY FOR ULTRASOUND SYSTEM

(75) Inventors: Wei Ma, San Ramon, CA (US);
Zhenyong Zhang, Sunnyvale, CA (US);
Shougang Wang, Santa Clara, CA (US);
Masood Yousefi, Cupertino, CA (US);
Ahmad Bahai, Lafayette, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 257 days.

(21) Appl. No.: 12/503,399

(22) Filed: Jul. 15, 2009

(65) Prior Publication Data

US 2011/0013488 A1    Jan. 20, 2011

(51) Int. Cl.
*G03B 42/06* (2006.01)
(52) U.S. Cl. .......................................... 367/11
(58) Field of Classification Search ............. 367/11
See application file for complete search history.

(56) References Cited

U.S. PATENT DOCUMENTS

| | | | | |
|---|---|---|---|---|
| 4,581,715 A | * | 4/1986 | Hyatt | 708/403 |
| 4,686,655 A | * | 8/1987 | Hyatt | 367/59 |
| 4,944,036 A | * | 7/1990 | Hyatt | 367/43 |
| 5,009,500 A | * | 4/1991 | Leonard et al. | 356/43 |
| 5,544,128 A | | 8/1996 | Kim et al. | |
| 5,997,479 A | | 12/1999 | Savord et al. | |
| 6,491,634 B1 | | 12/2002 | Leavitt et al. | |
| 6,926,671 B2 | * | 8/2005 | Azuma et al. | 600/459 |
| 7,478,041 B2 | * | 1/2009 | Ichikawa et al. | 704/233 |
| 2006/0119223 A1 | | 6/2006 | Ossmann | |
| 2007/0225604 A1 | * | 9/2007 | Fukukita | 600/437 |
| 2008/0146930 A1 | * | 6/2008 | Takeuchi | 600/447 |
| 2008/0181083 A1 | * | 7/2008 | Isshiki | 369/112.01 |
| 2010/0166124 A1 | * | 7/2010 | Behrens et al. | 375/344 |

OTHER PUBLICATIONS

International Search Report for PCT Application No. PCT/US2010/042064, 3 pages.
Written Opinion for PCT Application No. PCT/US2010/042064, 4 pages.

* cited by examiner

*Primary Examiner* — Jack W Keith
*Assistant Examiner* — James Hulka
(74) *Attorney, Agent, or Firm* — John J. Patti; Wade J. Brady, III; Frederick J. Telecky, Jr.

(57) ABSTRACT

Multi-channel receiver circuitry for a sub-beam forming receiver of an ultrasound system in which digital filtering, down-sampling and successive data storage circuitry impose programmable fine and coarse time delays on received digital data signals.

11 Claims, 7 Drawing Sheets

SUB-BEAM FORMING RECEIVER CIRCUITRY FOR ULTRASOUND SYSTEM

BACKGROUND

The present invention relates to receiver circuitry for an ultrasound system, and, in particular, to circuitry for providing sub-beam formed receive signals for an ultrasound system.

Referring to FIG. 1, a conventional ultrasound system includes a processor/controller 10 and analog front end (AFE) 20, as well as a user interface (not shown), such as a video display and computer keyboard and mouse. Included within the processor/controller 10 is a digital beam former 12 which provide multiple digital transmit data signals 13 defining the transmitted beam profile, and receives, in return, multiple digital receive data signals 33 representing the received energy profile. Any desired beam forming is performed within the beam former circuitry 12.

The transmission path of the AFE 20 includes multiple channels of digital-to-analog conversion (DAC) circuitry 22 and multiple transducer amplifier driver circuits 24. The transmit data signals 13 are converted to corresponding analog signals 23 for driving the driver circuits 24. Each of the resulting driver output signals 25 drives a respective transducer within the transducer array 28, and is conveyed via a transmit/receive switch 26, in accordance with well-known principles.

In accordance with further well known principles, reflected ultrasound energy received by the transducer array 28 is converted to corresponding analog electrical signals 27 which are conveyed via the transmit/receive switch 26 to respective time variable gain amplifier (TVGA) circuits 30. The resulting amplified signals 31 are converted by multiple channels of analog-to-digital conversion (ADC) circuitry 32 to produce the receive data signals 33.

Such ultrasound imaging systems operate in this manner to provide beam forming necessary for the desired image resolution and quality. As noted, the beam forming functions are typically implemented in the digital domain to achieve the desired flexibility and programmability. However, the power consumed by such digital domain circuitry has been increasing as speed and complexity of the processing increase. Such power consumption, and particularly any increases in power consumption, is particularly problematic as more systems are designed to be portable and operate under battery power. Additionally, as more complex transducer arrays are developed, the number of signals 13, 33 in the interface between the processor/controller 10 and AFE 20 have increased. Accordingly, it would be desirable to implement improved sub-beam forming so as to reduce power consumption and the number of signal connections between the processor/controller 10 and AFE 20.

SUMMARY

Multi-channel receiver circuitry for a sub-beam forming receiver of an ultrasound system is provided in which digital filtering, down-sampling and successive data storage circuitry impose programmable fine and coarse time delays on received digital data signals.

In accordance with one embodiment of the presently claimed invention, multi-channel receiver circuitry for a sub-beam forming receiver of an ultrasound system includes:

input signal delay circuitry responsive to one or more clock signals and each one of a plurality of incoming digital data signals by providing a respective plurality of delayed digital data signals;

signal selection circuitry coupled to the input signal delay circuitry and responsive to a first plurality of control data by selecting among each the respective plurality of delayed digital data signals to provide a plurality of selected delayed digital data signals;

output signal delay circuitry coupled to the signal selection circuitry and responsive to a second plurality of control data by delaying each of the plurality of selected delayed digital data signals to provide a plurality of further delayed digital data signals; and signal combining circuitry coupled to the output signal delay circuitry and responsive to the plurality of further delayed digital data signals by combining the plurality of further delayed digital data signals to provide a corresponding output data signal.

In accordance with another embodiment of the presently claimed invention, multi-channel receiver circuitry for a sub-beam forming receiver of an ultrasound system includes:

input signal delay means for receiving one or more clock signals and each one of a plurality of incoming digital data signals and in response thereto providing a respective plurality of delayed digital data signals;

signal selector means for receiving a first plurality of control data and in response thereto selecting among each the respective plurality of delayed digital data signals to provide a plurality of selected delayed digital data signals;

output signal delay means for receiving a second plurality of control data and in response thereto delaying each of the plurality of selected delayed digital data signals to provide a plurality of further delayed digital data signals; and signal combiner means for combining the plurality of further delayed digital data signals to provide a corresponding output data signal.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

Figure 1:
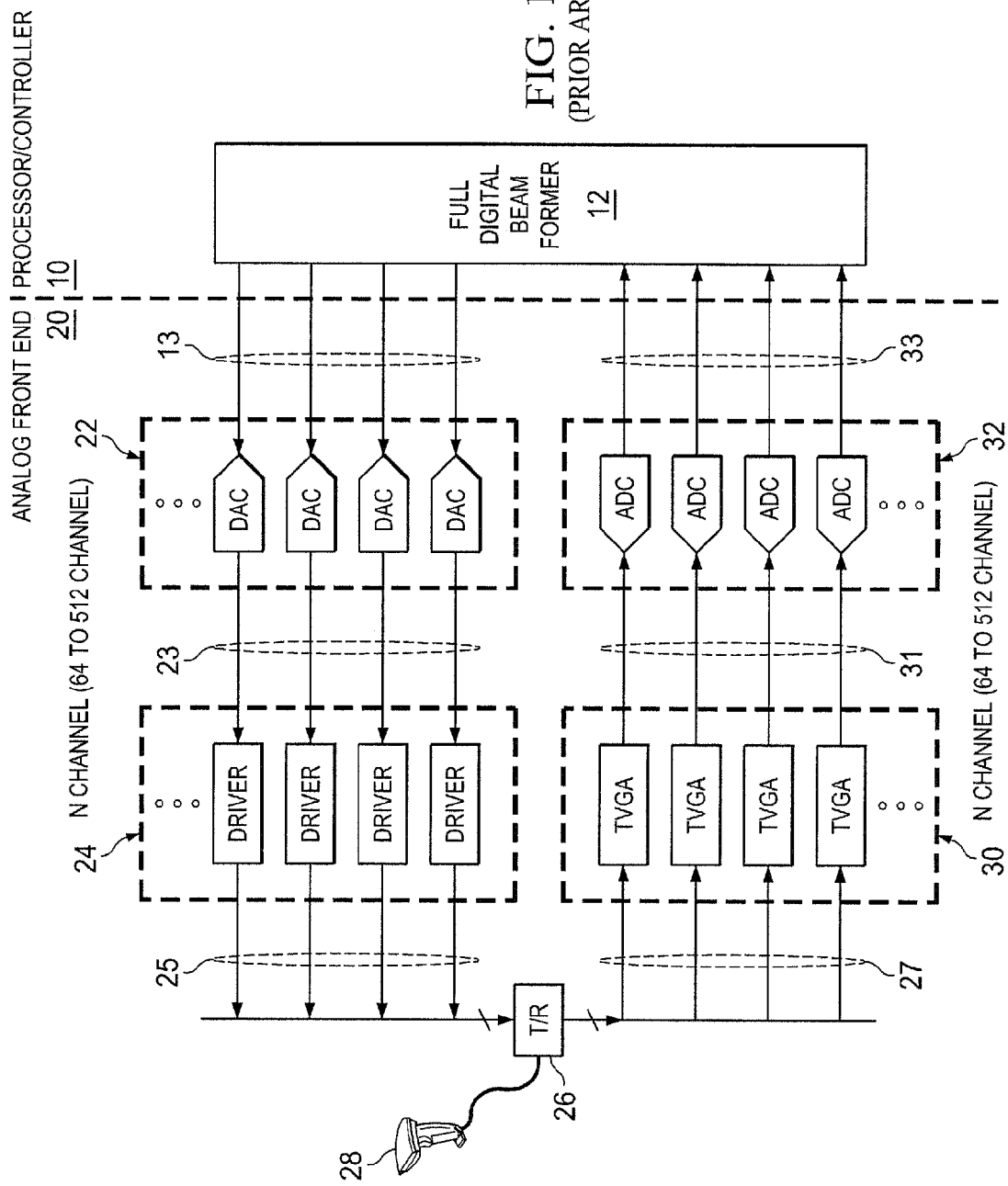
FIG. 1 is a functional block diagram of the transmit and receive channels of a conventional beam forming ultrasound system.
Figure 2:
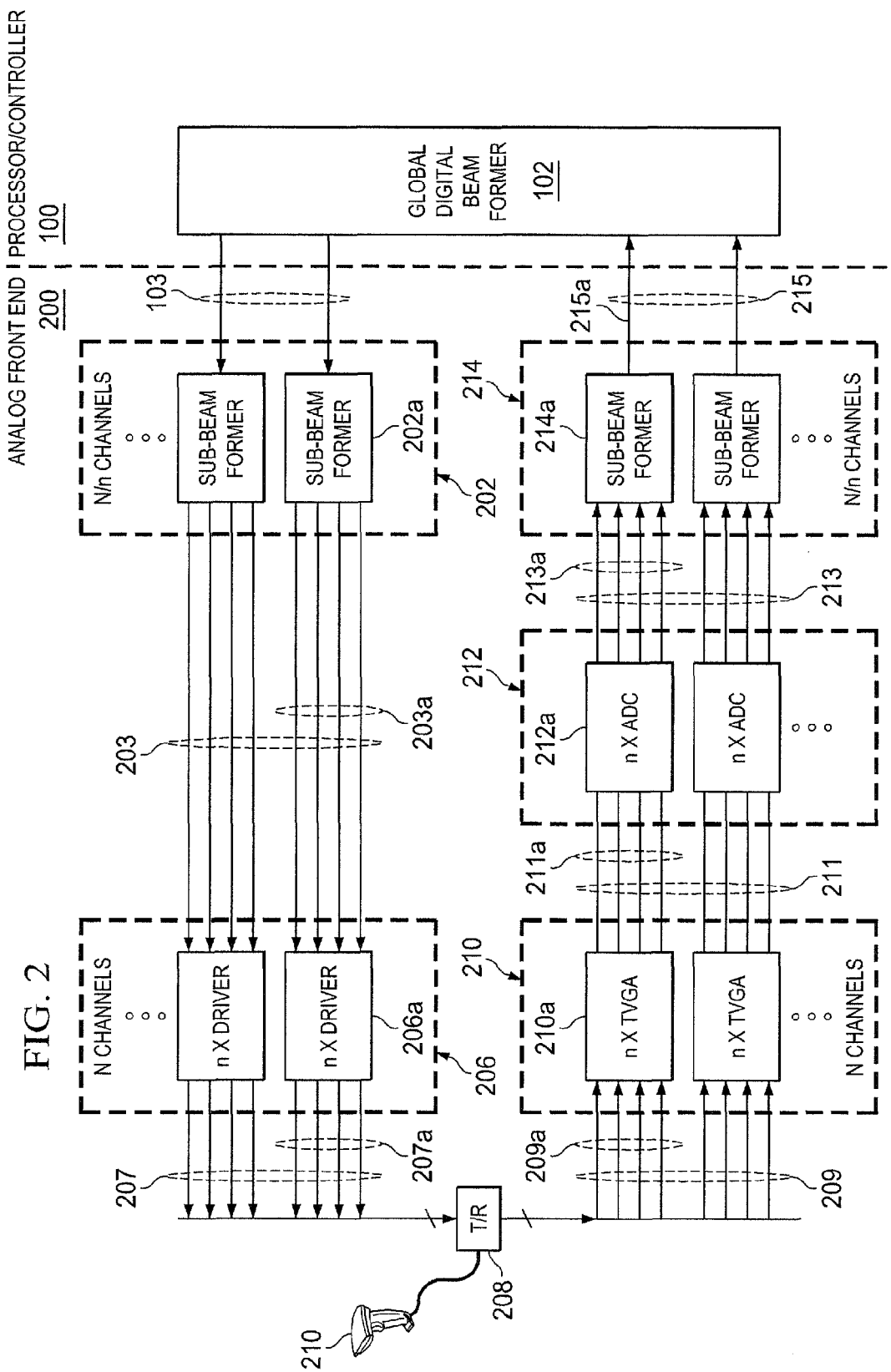
FIG. 2 is a functional block diagram of transmit and receive channels of an ultrasound system implementing sub-beam forming in accordance with one or more embodiments of the presently claimed invention.

Referring to FIG. 2, an ultrasound system employing sub-beam forming in accordance with one or more embodiments of the presently claimed invention simplifies the signal interface between the global digital beam former circuitry of the processor/controller 100 and the AFE 200. The global digital beam former 102 divides the total number N of channels into many smaller groups of n channels, or "sub-beams", which provide multiple sub-beams of transmit data signals 103 and multiple sub-beams of receive data signals 215. In the transmit path, these n data signals 103 are used to provide N sub-beam signals 203 by N/n sub-beam former circuits 202a. (For example, if the transducer array 210 is driven by N=256 signals, and each sub-beam former circuit 202 provides n=8 sub-beam signals, then the global digital beam former 102 need only provide N/n=32 transmit data signals 103.) The sub-beam signals 203 serve as analog drive signals for the driver circuits 206, which provide the drive signals 207 for the transducer array.

The receive signals 209 from the transducer array 210 are amplified by time variable gain amplifiers 210, and the resulting amplified signals 211 are converted by ADC circuits 212 to produce corresponding digital signals 213. These digital signals 213 are processed by sub-beam forming receiver circuits 214 (the subject matter of which is disclosed and one or more embodiments of which are claimed in a co-pending patent application) to provide the n receive data signals 215.

Such sub-beam forming in accordance with one or more embodiments of the presently claimed invention reduces overall system complexity and power consumption. For example, whereas conventional beam forming is performed in the digital domain, e.g., using a field programmable gate array (FPGA), e.g., as part of the global digital beam former 102, with a large number of interpolation computations consuming significant power, sub-beam forming in accordance with one or more embodiments of the presently claimed invention is performed in analog and mixed signal domains to achieve high accuracy while consuming less power.

Figure 3:
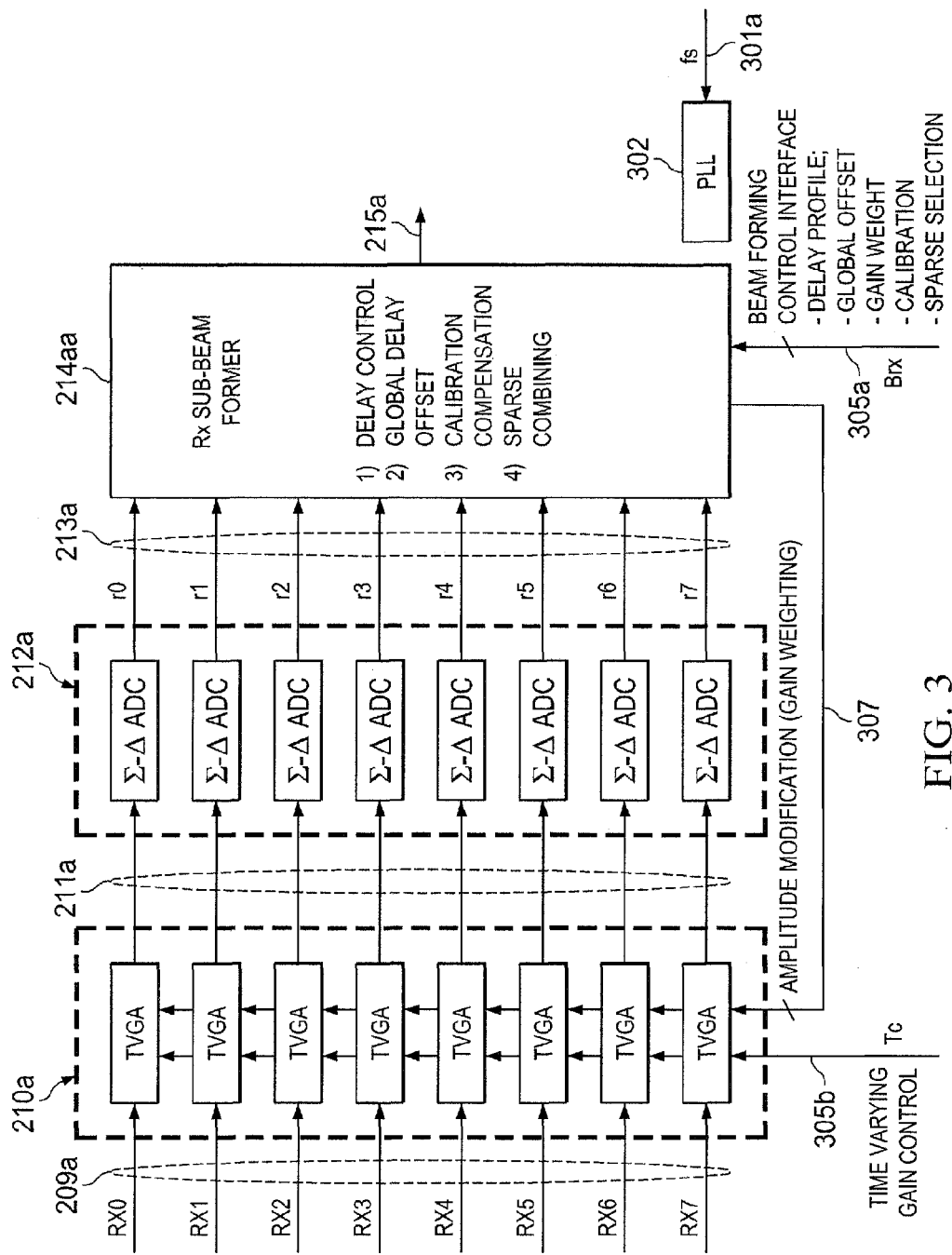
FIG. 3 is a functional block diagram of eight channels of an ultrasound system having a sub-beam forming receiver in accordance with one or more embodiments of the presently claimed invention.

Referring to FIG. 3, in accordance with one or more embodiments of the presently claimed invention, sub-beam forming is performed in the receive signal path (as an example, this discussion refers to the first subset of elements 210a, 212a, 214a in FIG. 2 operating on the first subset of receive signals 210a). As discussed above, the receive signals 209a are amplified by the time variable gain amplifiers 210a and the amplified signals 211a are converted by over-sampling ADC circuits 212a to produce the signals 213a for the sub-beam former circuitry 214aa. There is one TVGA in each ultrasound AFE. As is well known, the gain for each TVGA is controlled based on the rate of decay of the echo signal it receives, e.g., in accordance with a control signal 305b received from a main controller (not shown). One or more additional, or alternative, control signals 307 can be used to provide amplitude modification, e.g., via amplifier gain weighting. This can provide for more complex beam forming, if desired, and such additional control signals 307 can be provided via the sub-beam former circuitry 214aa in accordance with one or more control signals 305a, e.g., provided by the main controller (not shown).

In accordance with a preferred embodiment of the presently claimed invention, the ADC circuits 212a are implemented in the form of sigma-delta ADC circuits, also known as delta-sigma modulator (DSM) circuits, many types of which are well known in the art. In accordance with well known techniques, each ADC circuit converts its analog input signal to a digital signal, using over sampling techniques to convert to a high speed single-bit stream or a multi-bit stream, as desired.

The sub-beam former circuitry 214aa provides phase control by combining the multiple (e.g., eight) signals 213a into a single sub-beam signal 215a with fine delay resolution as accurate as that of the over-sampling frequency of the ADC circuits 212a. Required clock signals are provided by a clock circuit 302, e.g., a phase locked loop (PLL), in accordance with a sampling clock signal 301a.

Hence, as noted above, sub-beam forming in accordance with one or more embodiments of the presently claimed invention can be performed in mixed signal domains to achieve high accuracy while consuming less power. Amplitude control can be provided in the analog domain by controlling the gains for the TVGAs 210a in accordance with a control signal 305b received from a main controller (not shown), or one or more additional, or alternative, control signals 307 provided via the sub-beam former circuitry 214aa in accordance with one or more control signals 305a provided by the main controller. Phase control can be provided in the digital domain within the sub-beam former circuitry 214aa by combining multiple signals 213a with respective controlled signal phases into a single sub-beam signal 215a (discussed in more detail below).

Figure 4:
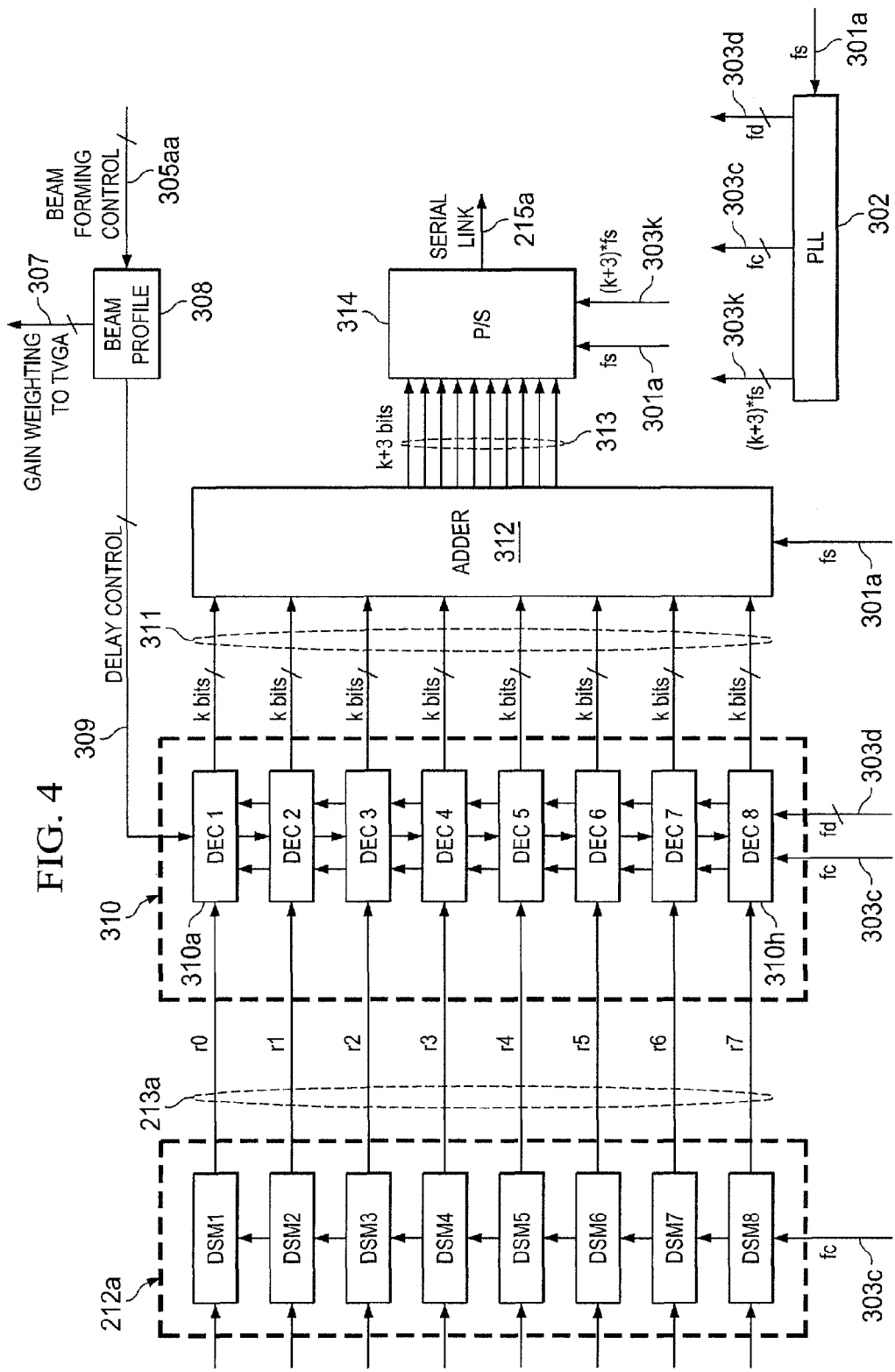
FIG. 4 is a functional block diagram of sub-beam forming receiver circuitry for an ultrasound system in accordance with one or more embodiments of the presently claimed invention.

Referring to FIG. 4, decimator filters 310 receive and filter the digital signals 213a produced by the DSM circuits 212a. The DSM circuits 212a are clocked by a clock signal having an over sampling frequency fc which is higher than the sampling frequency fs by a factor of N (fc=N*fs). Each of the decimator filters 310 is clocked with the over-sampling frequency clock signal 303c and several of its divided versions 303d, which are synchronized with the over-sampling clock signal 303c, where fd=(1, 2, . . . , m)*fs, m is an integer and m<fc/fs. As a result, the decimator filters 310 convert the low resolution, high frequency signals 213a from the DSM circuits 212a to corresponding high resolution, low frequency, multi-bit signals 311.

These multi-bit signals 311 are summed in a signal adding circuit 312 in accordance with a clock signal 301a having the sampling frequency fs. (Although not shown here, it will be readily understood that the signal gain weighting done in the TVFAs 210a can instead be done here, e.g., within the decimator filters 310 by multiplying their signals 311 by their respective weight factors received as part of one or more control signals 309 from a beam profile control circuit 308.) This produces a multi-bit (k+3 bits) sum signal 313. This parallel signal 313 is converted to a serial signal 215a by a parallel-to-serial converter 314, in accordance with the sampling frequency clock signal 301a for the input signal 313 and a higher frequency clock signal 303k having a frequency fk of fk=(k+3)*fs for the output signal 215a.

The clock signals 303c, 303d, 303k are provided by a clock circuit 302, e.g., a PLL, which uses the sampling frequency clock signal 301a as its reference signal.

As discussed in more detail below, the decimator filters 310 also receive the one or more control signals 309 from the beam profile control circuit 308 to control signal delays, among other things. These one or more control signals 309 are based on beam forming control data 305aa, e.g., provided by a master controller (not shown). This beam profile control circuitry 308 also provides the TVGA gain weighting control signals 307 (discussed above).

In accordance with this embodiment, this sub-beam forming technique combines multiple receive channels into a single channel by changing respective delays and amplitudes of the signals. Time delay changes are implemented by the programmable decimation filters 310, while signal amplitude changes are implemented through offsets within the TVGAs 210a (FIG. 3) or gain weighting of the decimator filter signals 311. As noted above, the beam pattern control data 305aa is normally provided by an external controller, such as the host computer (not shown) or a field programmable gate array (FPGA, not shown). As part of the beam forming control data 305aa, global beam forming offset information can be included for use as parts of or otherwise influencing the delay control signals 309 and gain control data 307. Calibration data can also be included, or stored locally, e.g., within the beam profile control circuit 308, for the delay and gain controls. Additionally, the beam forming control data 305aa can select which of the receive signals 209 (FIG. 2) are to be processed. For example, by selecting respective ones of the receive signals 209 corresponding to even or odd transducers within the array 210, or combining selected ones of the receive signals 209, effective beams can be formed, similar to activating some but not all of the transducers within the array 210.

As noted above, the decimation filters 310 down sample the over sampled data stream to a lower sampling rate, e.g., to the Nyquist rate. Since the decimation filters 310 have various sampling durations, the time delays needed for beam forming can be implemented by programmable time delays to generate sufficient delay resolution for dynamic beam focusing, and aligning the multi-channel data streams. Using such configurable decimation filters 310, different modes of operation can be implemented, including B-mode imaging and Doppler mode. For example, down sampling by a factor of 20 from 800 MS/s to 40 MS/s at 16 bits can be done, or down sampling by a factor of 20,000 to 40 KS/s at 24 bits for Doppler mode.

Such down sampling of the digitized receive signals 213a to the Nyquist rate with the decimation filters 310 generates sufficient delay resolution for receive sub-beam forming. For example, if the over sampling frequency fc is 800 MHz, a delay resolution of 1.25 nanoseconds is possible. However, beam forming at such a frequency requires a large amount of memory and can result in higher than desired power consumption.

Figure 5:
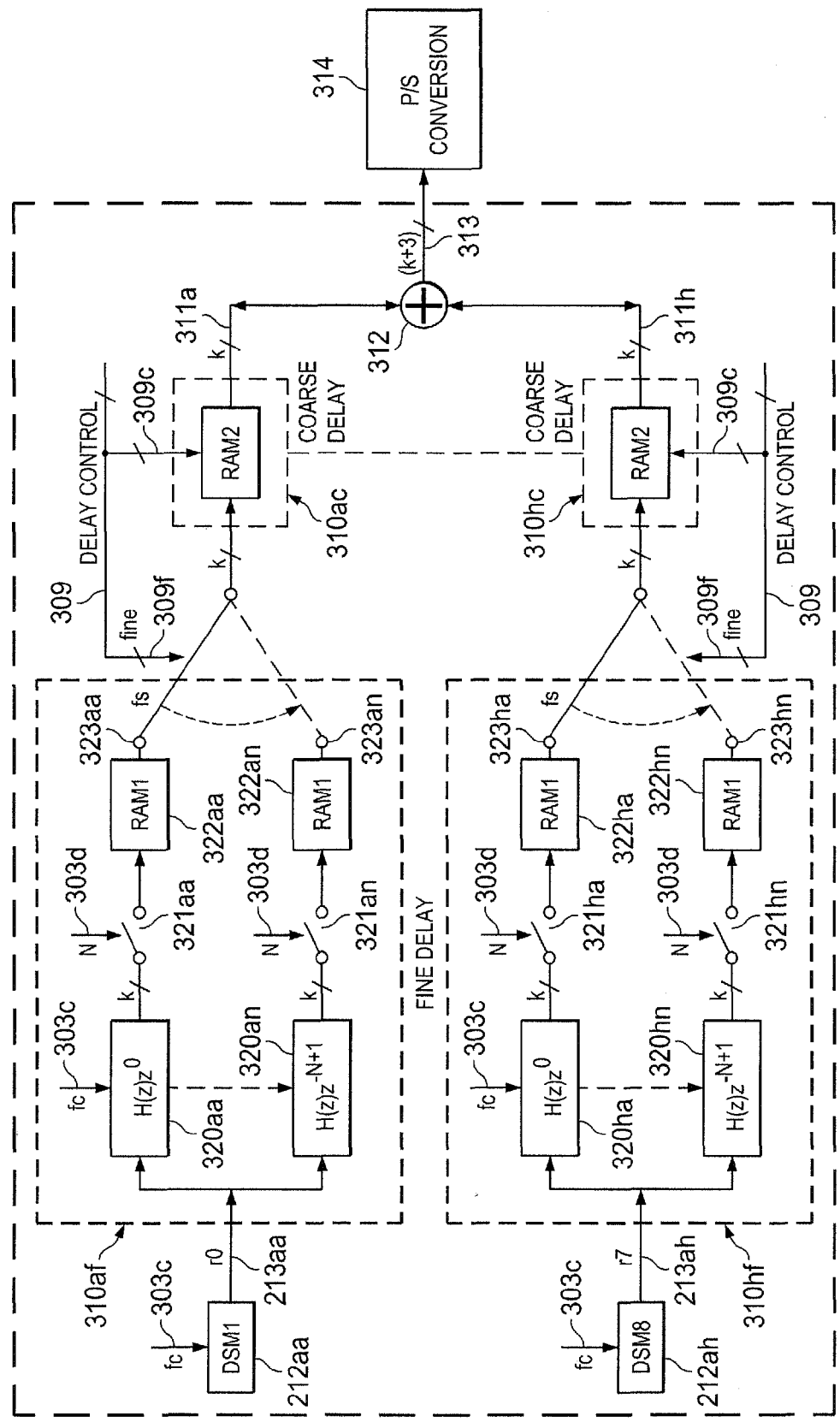
FIG. 5 is a functional block diagram of multi-phase sub-beam forming receiver circuitry implemented as part of sigma-delta ADC circuitry in accordance with one or more embodiments of the presently claimed invention.

Referring to FIG. 5, in accordance with one or more embodiments of the presently claimed invention, power consumption can be reduced while maintaining high resolution by configuring each decimation filter as a multi-phase filter, e.g., as an N-phase poly-phase filter bank with N outputs. For example, with reference to the first sub-beam channel, the fine delay section 310af includes N-phase poly-phase filters 320aa, . . . , 320an, each of which is clocked by the over sampling clock signal 303c and provides one of a sequence of time-delayed multi-bit signals 321aa, . . . , 321an. By generating evenly spaced N-phase outputs 321aa, . . . , 321an during each cycle of the clock signal 303d, the same fine delay (e.g., 1.25 nanoseconds for fc=800 MHz) can be realized. The signals 321aa, . . . , 321an are further down-sampled by the clock signal 303d and stored in respective registers or memory circuits 322aa, . . . , 322an. One of these stored sets of data 323aa, . . . , 323an is selected at the sampling frequency fs in accordance with the fine delay control data 309f received as part of the delay control data 309 (e.g., using address registers and signal routing circuitry, including switching circuitry, such as pass transistors or transmission gates, or multiplexor circuitry, all of which are well known in the art, with the fine delay control data 309f providing addressing information and serving as the switch or multiplexor control signals), and is stored in another register or memory circuit 310ac. This stored data 311a is accessed in accordance with coarse delay control data 309c received as part of the delay control data 309 (e.g., using address registers, which are well known in the art, with the coarse delay control data 309c providing addressing information), and are summed in the adder circuit 312, as discussed above. After the downstream coarse delays, the eight channels of data are in phase and beam formed to one data stream.

Figure 6:
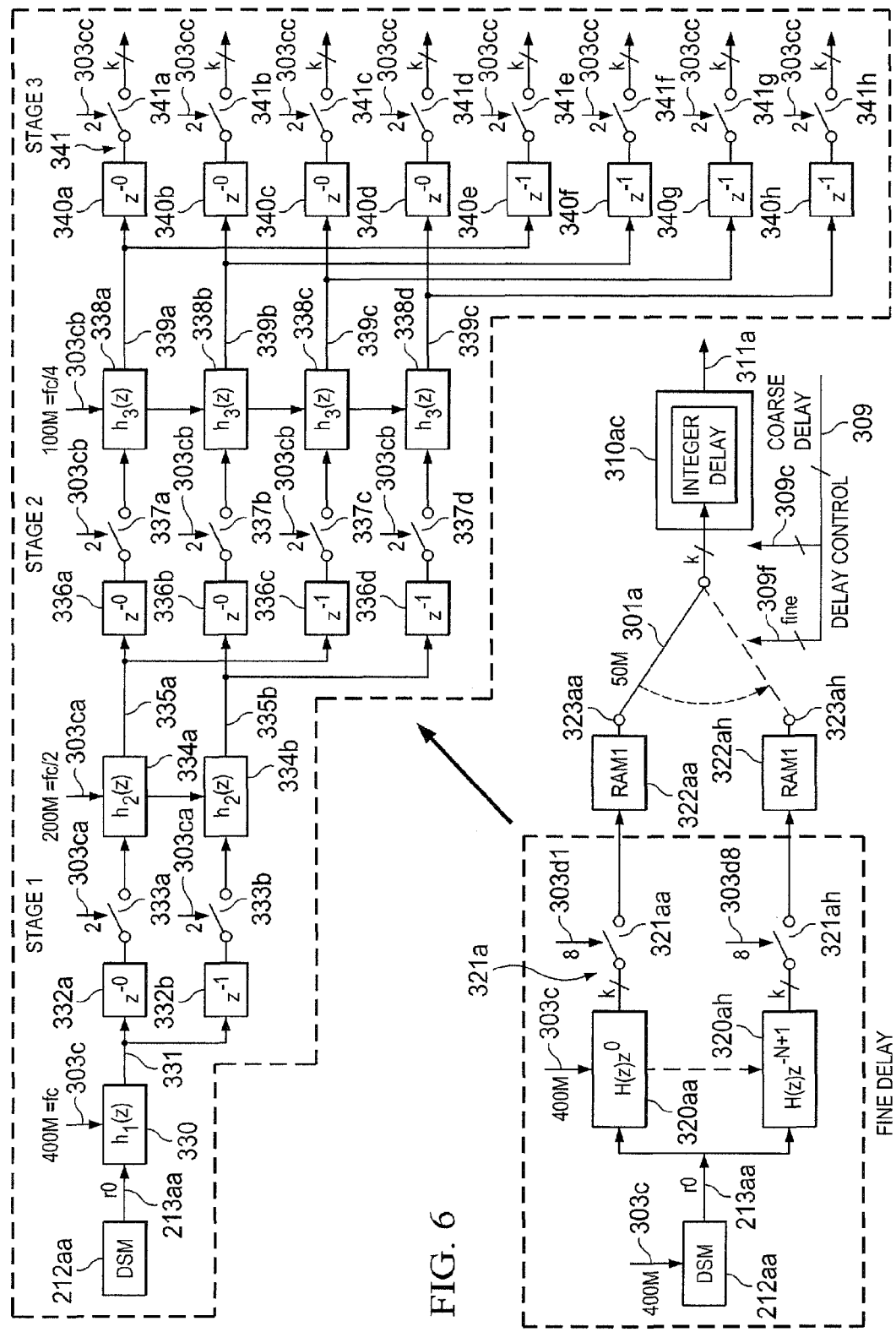
FIGS. 6 and 7 are functional block diagrams of multi-stage, multi-phase sub-beam forming receiver circuitry implemented as part of sigma-delta ADC circuitry in accordance with one or more embodiments of the presently claimed invention.

Referring to FIG. 6, in accordance with one or more embodiments of the presently claimed invention, power consumption can be further reduced while maintaining high resolution by configuring each decimation filter as a multi-phase, multi-stage filter with the fine delay section separated into multiple stages, e.g., three stages for purposes of this particular example. (For this example, the over sampling frequency fc is 400 MHz and N=8. Accordingly, the fine delay section can be implemented as three stages, since $2^3$=8.)

For example, with reference to the first sub-beam channel, the digitized receive signal 213aa is down sampled by a first decimation filter $h_1(z)$ 330 in accordance with the over sampling clock signal 303c. The down sampled data 331 are delayed by delay elements 332a, 332b. The two delayed signals 333a, 333b (two phases) down-sampled by the first reduced frequency clock signal 303ca for the second decimation filters $h_2(z)$ 334a, 334b. The further filtered data 335a, 335b form the two-phase outputs of the second decimation filters and are delayed through second delay elements 336a, 336b, 336c, 336d. The second delayed data 337a, 337b, 337c, 337d (signal with four phases) are down-sampled by the second reduced clock signal 303cb which drives the third decimation filters $h_3(z)$ 338a, 338b, 338c, 338d. These data 339a, 339b, 339c, 339d form the output of the third decimation filters 338a, 338b, 338c, 338d and are further delayed through third delay elements 340a, . . . , 340h (eight signal phases) to provide the delayed data 341 (341a, . . . , 341h) which correspond to the delayed data 321a (321aa, . . . , 321*ah*) from the first N-phase poly-phase filter 320*aa* (FIG. 5). The delayed data 341*a*, . . . , 341*h* are down-sampled by the third reduced frequency clock signal 303*cc* prior to storage in the register or memory circuit 322*aa* (FIG. 5). The eight multi-phase signals 323*aa*, . . . , 323*ah* are selected in accordance with the fine delay requirement and further delayed by the coarse delay unit 310*ac* by selected integer sample intervals, so that the total delay is a combination of fractional and integer sample delays.

Figure 7:
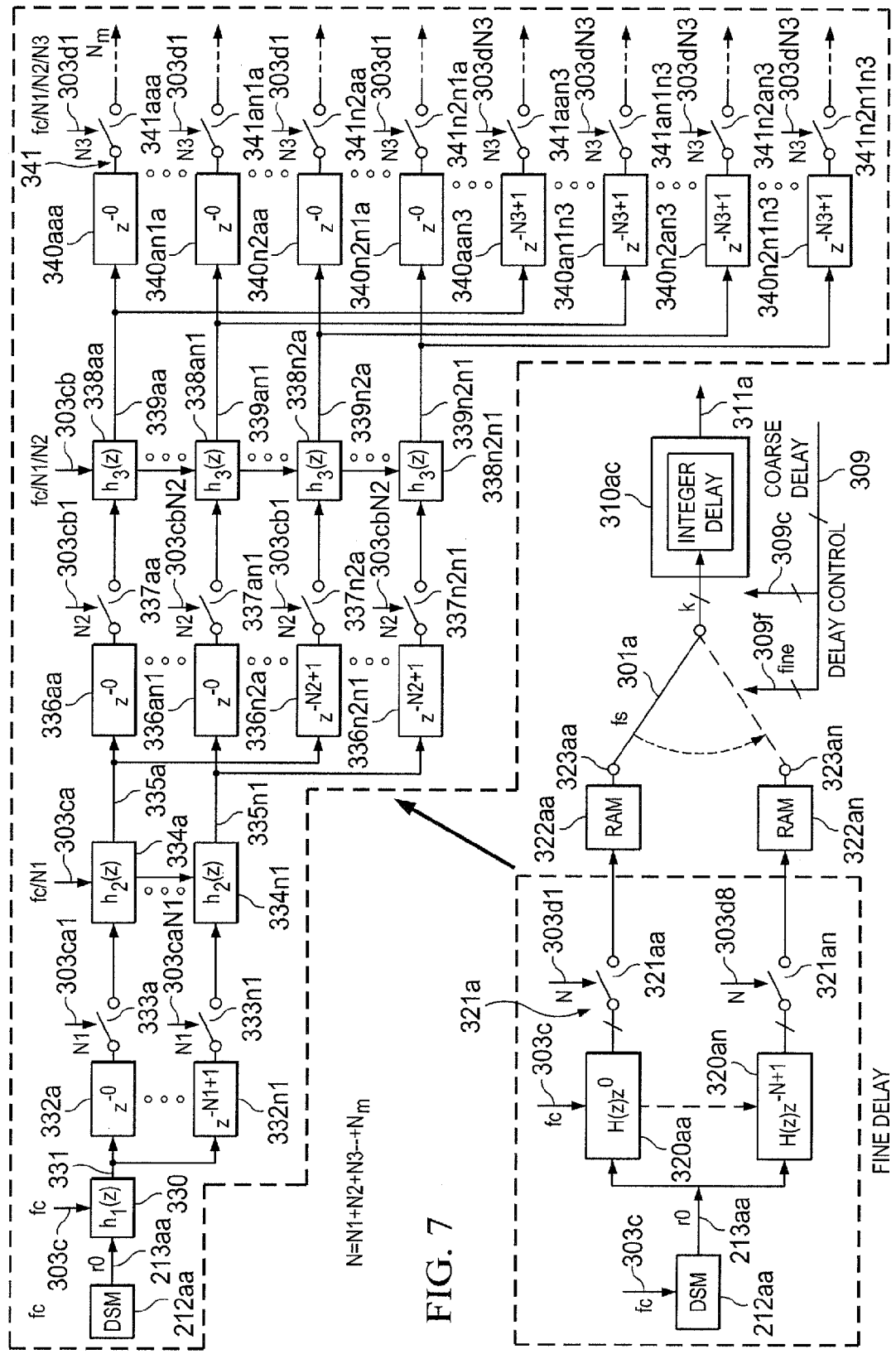

Referring to FIG. 7, it can be seen that such staging of the fine delay process can be extended to any over sampling ratio N with no more than N frequency synchronized clock signals required to M stages where M<=log2(N). Such a poly-phase filter structure resembles a tree in that more paths operate in parallel in downstream stages, with such stages running at lower frequencies, thereby consuming less power.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including multi-channel receiver circuitry for a sub-beam forming receiver of an ultrasound system, comprising:
   input signal delay circuitry responsive to one or more clock signals and each one of a plurality of incoming digital data signals by providing a respective plurality of delayed digital data signals, wherein each one of said plurality of incoming digital data signals has a first resolution and a first frequency;
   signal selection circuitry coupled to said input signal delay circuitry and responsive to a first plurality of control data by selecting among each said respective plurality of delayed digital data signals to provide a plurality of selected delayed digital data signals;
   output signal delay circuitry coupled to said signal selection circuitry and responsive to a second plurality of control data by delaying each of said plurality of selected delayed digital data signals to provide a plurality of further delayed digital data, wherein each one of said plurality of further delayed digital data signals has a second resolution and a second frequency, said second resolution is higher than said first resolution and said second frequency is lower than said first frequency of a corresponding one of said one of a plurality of incoming digital data signals; and
   signal combining circuitry coupled to said output signal delay circuitry and responsive to said plurality of further delayed digital data signals by combining said plurality of further delayed digital data signals to provide a corresponding output data signal.

2. The apparatus of claim 1, wherein said input signal delay circuitry comprises:
   filter circuitry responsive to each one of a plurality of incoming digital data signals by providing a respective plurality of filtered digital data signals;
   sampling circuitry coupled to said filter circuitry and responsive to each said respective plurality of filtered digital data signals by providing a respective plurality of sampled digital data signals; and
   data storage circuitry coupled to said sampling circuitry and responsive to each said respective plurality of sampled digital data signals by providing said respective plurality of delayed digital data signals.

3. The apparatus of claim 1, wherein said signal selection circuitry comprises signal routing circuitry.

4. The apparatus of claim 1, wherein said output signal delay circuitry comprises data storage circuitry.

5. The apparatus of claim 1, wherein said signal combining circuitry comprises signal summing circuitry.

6. The apparatus of claim 1, wherein:
   said input signal delay circuitry provides said respective plurality of delayed digital data signals in accordance with a first delay;
   said output signal delay circuitry provides said plurality of further delayed digital data signals in accordance with a second delay; and
   said first delay is less than said second delay.

7. The apparatus of claim 1, wherein said input signal delay circuitry comprises:
   first filter circuitry responsive to a first one of said one or more clock signals and said each one of said plurality of incoming digital data signals by providing a respective plurality of first filtered digital data signals;
   first delay circuitry coupled to said first filter circuitry and responsive to each said respective plurality of first filtered digital data signals by providing a respective plurality of first delayed digital data signals;
   first sampling circuitry coupled to said first delay circuitry and responsive to each said respective plurality of first delayed digital data signals by providing a respective plurality of first sampled digital data signals;
   second filter circuitry coupled to said first sampling circuitry and responsive a second one of said one or more clock signals and to each said respective plurality of first sampled digital data signals by providing a respective plurality of second filtered digital data signals;
   second delay circuitry coupled to said second filter circuitry and responsive to each said respective plurality of second filtered digital data signals by providing a respective plurality of second delayed digital data signals; and
   second sampling circuitry coupled to said second delay circuitry and responsive to each said respective plurality of second delayed digital data signals by providing a respective plurality of second sampled digital data signals.

8. The apparatus of claim 7, wherein:
   said first one of said one or more clock signals has a first frequency;
   said second one of said one or more clock signals has a second frequency; and
   said second frequency is one-half of said first frequency.

9. The apparatus of claim 7, wherein said input signal delay circuitry further comprises:
   third filter circuitry coupled to said first sampling circuitry and responsive a third one of said one or more clock signals and to each said respective plurality of second sampled digital data signals by providing a respective plurality of third filtered digital data signals;
   third delay circuitry coupled to said third filter circuitry and responsive to each said respective plurality of third filtered digital data signals by providing a respective plurality of third delayed digital data signals; and
   third sampling circuitry coupled to said third delay circuitry and responsive to each said respective plurality of third delayed digital data signals by providing a respective plurality of third sampled digital data signals.

10. The apparatus of claim 9, wherein:
said first one of said one or more clock signals has a first frequency;
said second one of said one or more clock signals has a second frequency;
said third one of said one or more clock signals has a third frequency;
said second frequency is one-half of said first frequency; and
said third frequency is one-fourth of said first frequency.

11. An apparatus including multi-channel receiver circuitry for a sub-beam forming receiver of an ultrasound system, comprising:
input signal delay means for receiving one or more clock signals and each one of a plurality of incoming digital data signals and in response thereto providing a respective plurality of delayed digital data signals, wherein each one of said plurality of incoming digital data signals has a first resolution and a first frequency;
signal selector means for receiving a first plurality of control data and in response thereto selecting among each said respective plurality of delayed digital data signals to provide a plurality of selected delayed digital data signals;
output signal delay means for receiving a second plurality of control data and in response thereto delaying each of said plurality of selected delayed digital data signals to provide a plurality of further delayed digital data, wherein each one of said plurality of further delayed digital data signals has a second resolution and a second frequency, said second resolution is higher than said first resolution and said second frequency is lower than said first frequency of a corresponding one of said one of a plurality of incoming digital data signals; and
signal combiner means for combining said plurality of further delayed digital data signals to provide a corresponding output data signal.

* * * * *